US 11,445,851 B2

(12) United States Patent
Colonna et al.

(10) Patent No.: US 11,445,851 B2
(45) Date of Patent: Sep. 20, 2022

(54) MACHINE FOR THE PREPARATION OF BEVERAGES, IN PARTICULAR ESPRESSO COFFEE, AND DEVICE FOR SELF-PRIMING WHICH CAN BE USED IN SAID MACHINE

(71) Applicant: Luigi Lavazza S.p.A., Turin (IT)

(72) Inventors: Andrea Colonna, Turin (IT); Denis Rotta, Turin (IT); Gabriele Picone, Pino Torinese (IT)

(73) Assignee: Luigi Lavazza S.p.A., Turin (IT)

( * ) Notice: Subject to any disclaimer, the term of this patent is extended or adjusted under 35 U.S.C. 154(b) by 690 days.

(21) Appl. No.: 16/322,243

(22) PCT Filed: Jul. 28, 2017

(86) PCT No.: PCT/IB2017/054600
§ 371 (c)(1),
(2) Date: Jan. 31, 2019

(87) PCT Pub. No.: WO2018/025134
PCT Pub. Date: Feb. 8, 2018

(65) Prior Publication Data
US 2019/0191920 A1    Jun. 27, 2019

(30) Foreign Application Priority Data

Aug. 5, 2016   (IT) .................. 102016000083066

(51) Int. Cl.
*A47J 31/36* (2006.01)
*A47J 31/46* (2006.01)
(Continued)

(52) U.S. Cl.
CPC ............. *A47J 31/36* (2013.01); *A47J 31/461* (2018.08); *A47J 31/469* (2018.08); *F16K 17/04* (2013.01); *F16K 31/12* (2013.01)

(58) Field of Classification Search
CPC ...... A47J 31/461; A47J 31/462; A47J 31/469; A47J 31/36; F16K 49/002; F16K 17/04; F16K 31/12
(Continued)

(56) References Cited

U.S. PATENT DOCUMENTS 3,586,040 A * 6/1971 Urback ................... F04D 9/006
137/517
5,682,920 A * 11/1997 De'Longhi ......... F16K 17/0473
137/341
(Continued)

FOREIGN PATENT DOCUMENTS

WO      2014/071856      5/2014
WO      2016/087996      6/2016

OTHER PUBLICATIONS

International Search Report and Written Opinion of the ISA for PCT/IB2017/054600, dated Nov. 20, 2017, 11 pages.

*Primary Examiner* — Reginald Alexander
(74) *Attorney, Agent, or Firm* — Nixon & Vanderhye P.C.

(57) ABSTRACT

A machine for the preparation of beverages, comprising a hydraulic circuit that includes: —a brewing unit; —a water tank; —a pump having its inlet connected in fluid communication to the water tank and its outlet or delivery connected in fluid communication to the brewing unit; —a heating device for heating water forced by the pump towards the brewing unit; —a self-priming device (22), which comprises a hollow housing structure (27, 28), having an inlet (22a) in fluid communication with the outlet or delivery of the pump, and an outlet for spillage of water towards a collecting space, in particular the water tank. The self-priming device (22) comprises a spillage member (30), which is set between the inlet (22a) and the outlet (22b). The spillage member (30) has a body that is made of a material that is permeable
(Continued)

to water and to air and that is such as to be traversed by water and air when the pump is active.

16 Claims, 8 Drawing Sheets

(51) Int. Cl.
*F16K 17/04* (2006.01)
*F16K 31/12* (2006.01)

(58) Field of Classification Search
USPC .................. 99/302 R; 137/517, 341, 535
See application file for complete search history.

(56) References Cited

U.S. PATENT DOCUMENTS

| | | | |
|---|---|---|---|
| 5,911,562 A * | 6/1999 | Murphy | F04B 53/1025 |
| | | | 417/299 |
| 2008/0283131 A1 | 11/2008 | Etter et al. | |
| 2009/0151573 A1 * | 6/2009 | Tonelli | A47J 31/461 |
| | | | 99/280 |

* cited by examiner

MACHINE FOR THE PREPARATION OF BEVERAGES, IN PARTICULAR ESPRESSO COFFEE, AND DEVICE FOR SELF-PRIMING WHICH CAN BE USED IN SAID MACHINE

This application is the U.S. national phase of International Application No. PCT/IB2017/054600 filed 28 Jul. 2017 which designated the U.S. and claims priority to IT Patent Application No. 102016000083066 filed 5 Aug. 2016, the entire contents of each of which are hereby incorporated by reference.

FIELD OF THE INVENTION

The present invention regards in general machines for preparing beverages, in particular espresso coffee. The invention has been developed with particular reference to devices for self-priming used on such machines.

PRIOR ART

Machines for the preparation of beverages typically comprise a brewing unit, which is supplied via a pump, usually a vibration pump. The inlet of the pump is connected to a water tank, and its outlet or delivery is instead connected in fluid communication to the brewing unit. Provided between the delivery of the pump and the brewing unit is a heating device, for heating the water, as well as at least one normally closed unidirectional valve, which opens when the pressure of the water forced by the pump exceeds a substantially pre-set pressure, usually of approximately 2 bar.

During or after a cycle of delivery of the beverage (i.e., in the course of operation of the pump or following upon interruption of its operation at the end of such a cycle), it is possible for air to be present in the hydraulic circuit of the machine. The presence of air may be due to emptying of the hydraulic circuit that occurs during delivery on account of the presence of an insufficient amount of water in the tank. Other possible causes may be the absence of the tank or a wrong positioning thereof, for example after its removal carried out by the user, or again on account of a prolonged disuse of the machine.

The presence of air in the hydraulic circuit may cause problems of priming of the pump. For this reason, machines of the type referred to are usually provided with a device for self-priming. Known devices for self-priming usually comprise a tubular housing structure, at times defined by the body of a hydraulic component of the machine (such as a solenoid valve), with an inlet that is connected in fluid communication to the delivery of the pump, and an outlet connected in fluid communication to a collecting space, such as the water tank of the machine.

When the pump of the machine is activated for preparation of a beverage, the self-priming device enables a modest spillage of water and of air from the hydraulic circuit, thereby preventing problems in priming of the pump itself. When, after deactivation of the pump, the circuit returns to the ambient pressure, spillage of water from the self-priming device is interrupted.

Known self-priming devices are usually of a mechanical type; i.e., they comprise a spillage member that is slidingly housed within a respective seat defined by the corresponding housing structure.

The spillage member is in general a piston having a portion of restricted diameter at its end facing the outlet, which functions as valve member, and fitted at least on said portion is a spring. The spring is operative for keeping a conical end of the portion of restricted diameter in a position axially set at a distance from the outlet. The piston then has a portion of larger diameter, substantially corresponding to the diameter of its sliding seat defined by the housing structure.

The gap existing between the portion of larger diameter of the piston and the corresponding seat enables passage of water towards the area of the seat itself in which the portion of restricted diameter, namely, the outlet, is located. In this outlet area, via the spring and possible notches present on the conical end of the restricted portion of the piston, a seepage of water from the outlet is allowed. The aforementioned spring enables a certain sliding of the piston under the thrust of the water but, even in its condition of maximum compression, the presence of the aforementioned notches does not cause complete closing of the outlet in such a way that the self-priming device will always allow a seepage of water and possibly of air, when the pump is active.

Devices for Self-priming of the type referred to present some drawbacks, typically in the long term, principally linked to their structure. The fact that the piston-type spillage member is a sliding component leads to mechanical wear, which over time may cause excessive bleeding-off of water or possible sticking. Also the occasional presence of impurities in the water may be a source of sticking.

Devices for self-priming of the type referred to are moreover generally reliable in the case of use in combination with pulsating pumps, such as the vibration pumps frequently used in machines for the preparation of beverages, but may prove less efficient in the case of use of non-pulsating pumps or pumps with constant delivery, typically pumps driven by a rotary-shaft electric motor. Given that the driving force generated by a vibration pump is a pulsating force, the open/close piston of self-priming devices of the type referred to above is subject to vibration so as to modulate to a certain extent the spillage of water as a function of the above vibration. These known devices, conceived for a pulsating forcing, may hence behave in a way different from the expected one when used in combination with pumps with constant delivery.

Aims and Summary of the Invention

The present invention is basically aimed at overcoming the drawbacks referred to above, via a machine for the preparation of beverages of the type referred to at the start provided with a device for self-priming that is simple to produce, economically advantageous, and reliable. A correlated aim of the invention is to provide a device for self-priming suitable for use in a machine of the type referred to.

The above and other objects are achieved, according to the invention, by a machine having the characteristics specified in Claim 1. Likewise forming the subject of the present invention are a device for self-priming and a valve device for use in a machine for the preparation of beverages of the type defined above, as specified in Claims 13 and 15. Advantageous embodiments of the invention are specified in the sub-claims. The claims form an integral part of the technical teaching provided herein in relation to the invention.

BRIEF DESCRIPTION OF THE DRAWINGS

Further aims, characteristics, and advantages of the invention will emerge from the ensuing detailed description, developed purely by way of non-limiting example with reference to the attached drawings, wherein.

DESCRIPTION OF PREFERRED EMBODIMENTS

In the ensuing description, various specific details are illustrated aimed at providing an in-depth understanding of the embodiments. The embodiments may be obtained without one or more of the specific details, or with other methods, components, materials, etc. In other cases, structures, materials, or operations that are known or evident to the person skilled in the branch are not illustrated or described in detail so that the various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment", "in various embodiments", and the like, which may appear in various points of the present description do not necessarily refer to one and the same embodiment. Moreover, particular conformations, structures, or characteristics may be combined in any adequate way in one or more embodiments. The references used herein are provided merely for convenience and hence do not define the sphere of protection or the scope of the embodiments.

Figure 1:
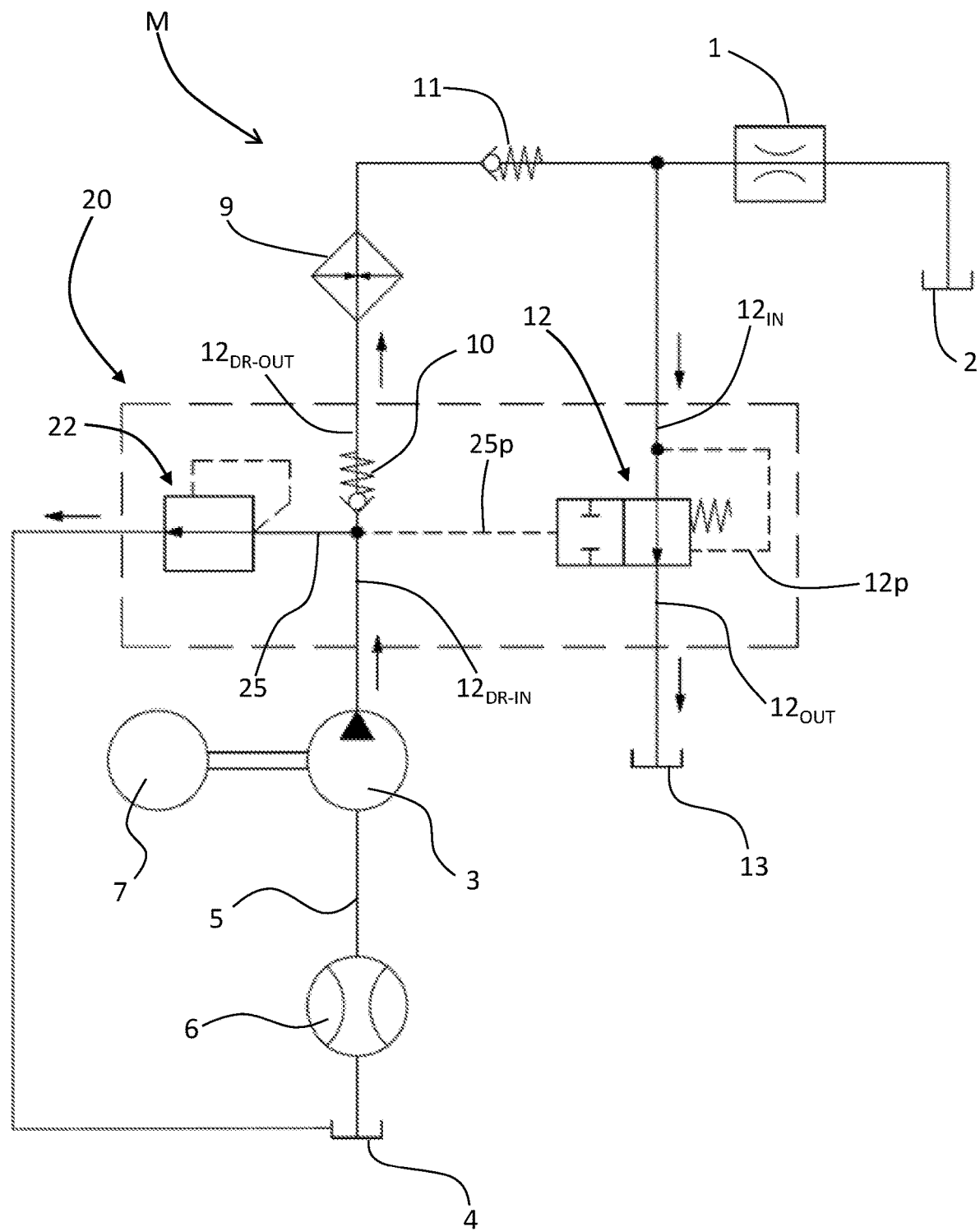
FIG. 1 is a schematic illustration of a machine for the preparation of beverages according to possible embodiments of the invention.

In FIG. 1 designated as a whole by M is a machine for the preparation of beverages. The machine M is illustrated limitedly to a hydraulic circuit thereof, useful for an understanding of the present invention. The hydraulic circuit includes a brewing unit 1, which from the hydraulic standpoint is substantially equivalent to a flow limiter, for delivering a beverage into a cup 2 or the like.

An electric pump 3 has the inlet connected to a water tank 4 via an intake duct 5 on which a flowmeter 6 can be set, for example of the turbine type, to supply electrical signals (pulses) indicating the flow rate of water drawn in by the pump 3. The pump 3 may be a vibration electric pump, or else a pump driven by an electric motor 7 with rotary shaft, of a type in itself known.

The pressurised water delivered at outlet by the pump 3 reaches an electrical heating device or boiler 9, and from this proceeds towards the brewing unit 1. Preferentially, provided between the pump 3 and the brewing unit 1 is at least one normally closed unidirectional hydraulic valve, designed to enable a flow of water towards the brewing unit when the pressure of the water coming from the pump exceeds a pre-set threshold value, equal for example to 2 bar. In the case exemplified in FIG. 1 two of such valves are provided, one upstream and the other downstream of the heating device 9, which are designated by 10 and 11, respectively.

Designated by 12 is a discharge valve, the functions of which will be clarified hereinafter. In the non-limiting example illustrated, the valve 12 is a normally open two-position valve, and operatively associated thereto is a device for self-priming, obtained according to possible embodiments of the invention. In various embodiments, the valve 12 and the device for self-priming are integrated in a single valve device, such as the one designated by 20.

In various embodiments, the valve 12 is a hydraulically driven discharge valve, which comprises:
- a main inlet $12_{IN}$, designed for connection to the hydraulic circuit of the machine M between the unidirectional valve 11 and the brewing unit 1;
- a main outlet $12_{OUT}$, designed to be connected in fluid communication to a drain-off receptacle 13, or some other discharge space;
- an auxiliary inlet $12_{DR-IN}$, designed to be connected to the delivery of the pump 3;
- an auxiliary outlet $12_{DR-OUT}$, designed for connection to the brewing unit 1, upstream of the unidirectional valve 10; and
- a further outlet 25, designed to be set in fluid communication with a device for self-priming 22, for controlled spillage of water forced by the pump 3; the device 22 has an outlet, preferentially communicating with the tank 4.

In the machine exemplified, the outlet 25 and the main inlet $12_{IN}$ constitute respective drives of the valve 12 designated, respectively, by 25p and 12p in the hydraulic diagram of FIG. 1 one set between the inlet $12_{DR-IN}$ and the outlet $12_{DR-OUT}$, upstream of the unidirectional valve 10, and the other set between the inlet $12_{IN}$ and the outlet $12_{OUT}$.

The inlet $12_{IN}$ and the outlet $12_{OUT}$ are here defined as "main" in so far as they are linked to the main discharge function of the valve 12, in addition to hydraulic driving into the opening condition of a valve member thereof. Instead, the inlet $12_{DR-IN}$ and the outlet $12_{DR-OUT}$ are here defined as "auxiliary" in so far as they are basically linked to functions of hydraulic driving into the closing condition of the aforesaid valve member of the valve 12.

The specific implementation and operation of the valve 12, or of the device 20 that integrates it, are irrespective of the aims of the invention, and may be obtained, for example, according to the modalities described in the international patent application No. PCT/IB2016/053490, filed in the name of the present Applicant.

Here suffice it to say that the arrangement is such that, after the pump 3 is activated for preparation of a beverage, the water forced into the auxiliary inlet $12_{DR-IN}$ causes switching of a valve member of the discharge valve 12 from its normally open condition into its closed condition. In this way, the water that leaves the auxiliary outlet $12_{DR-OUT}$ of the valve 12 cannot flow out of the main outlet $12_{OUT}$, reaching, instead, only the brewing unit 1.

Next, once delivery of the beverage is through, the pump 3 is deactivated and, both thanks to the connection 25 to the device for self-priming 22 and thanks to the presence of the aforesaid hydraulic drive for opening 25p and hydraulic drive for closing 12p, the valve 12 returns to its normal opening condition, which enables the water to flow away freely between the main inlet $12_{IN}$ and the main outlet $12_{OUT}$, i.e., the water residue present in the part of the circuit comprised between the unidirectional valve 11 and the brewing unit 1 to be discharged, thus enabling evacuation of particulate in suspension that may be present in the water.

Figure 2:
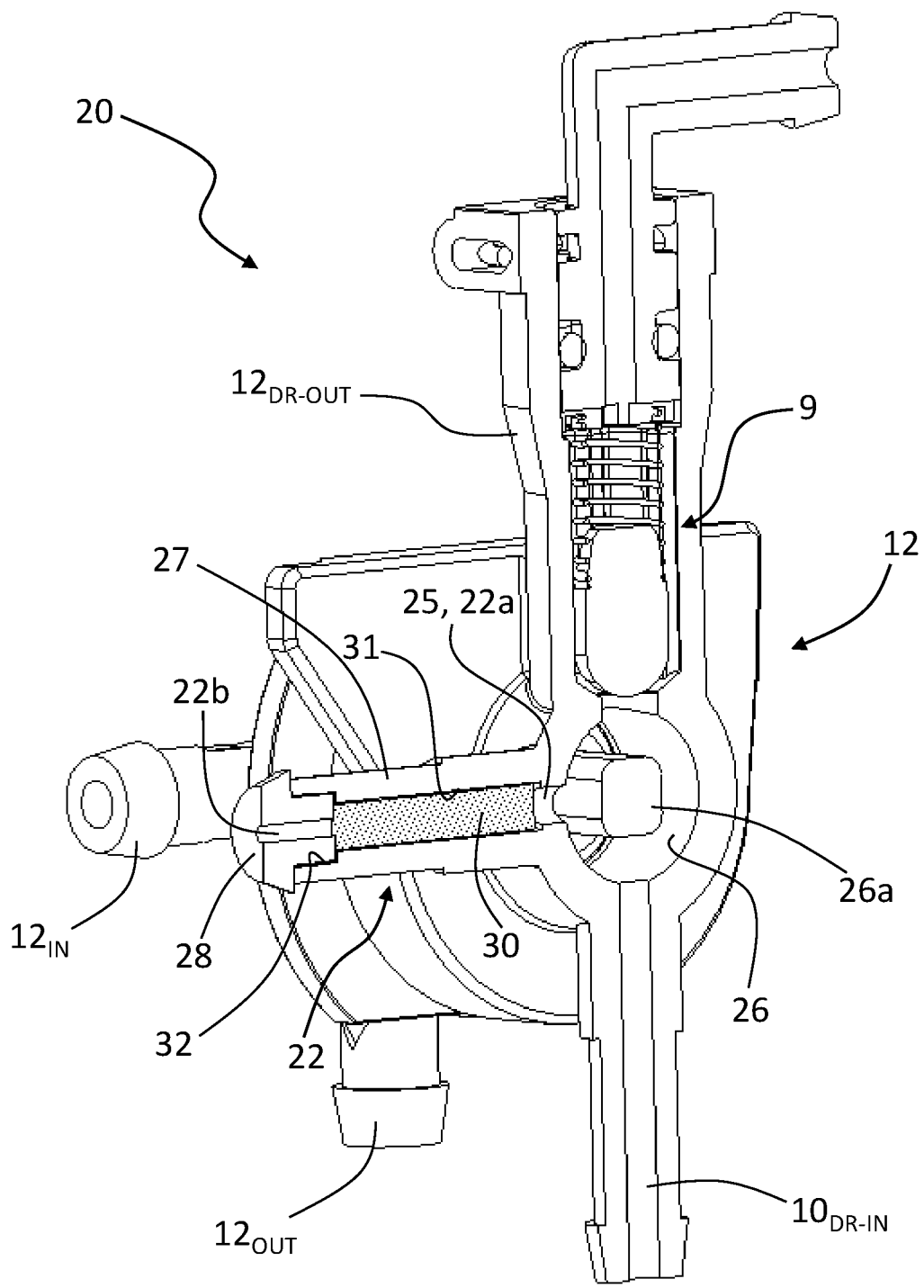
FIG. 2 is a schematic cross-sectional view of a valve device that integrates a self-priming device according to possible embodiments of the invention.

In FIG. 2, the valve 12, or the valve device 20, is illustrated in cross-sectional view, limitedly to the parts of immediate interest for an understanding of the invention, which pertain to the device for self-priming 22. In this figure, designated by 26 is a chamber inside the valve 12, which communicates with the auxiliary inlet $12_{DR-IN}$, with the auxiliary outlet $12_{DR-OUT}$, and with the further outlet 25. In the example, defined inside the chamber 26 is an end-of-travel detent 26a for a valve member of the valve 12; this valve member is visible in FIG. 3, where it is designated by 26b.

In various embodiments, the device for self-priming 22 comprises a hollow housing structure, having an inlet in fluid communication with the delivery of the pump, and an outlet for enabling spillage of water towards a collecting space, as mentioned previously (such as the tank 4 of FIG. 1).

In various embodiments, the housing structure of the device 22 is at least in part defined in a single piece with the body of a hydraulic member of the machine M. With reference to the example illustrated, the housing structure then comprises an axially hollow tubular casing 27, defined by the body of the valve 12, with its inlet 22a that corresponds to the outlet 25 of the valve itself.

In various embodiments, such as the one exemplified, the housing structure further comprises a closing element 28, which is coupled to a corresponding end of the casing 27, here the end opposite to the inlet 22a. The closing element 28, configured substantially like a plug, defines the outlet of the casing structure, designated by 22b, represented, for example, by a through hole of the element 28 itself.

Set between the inlet 22a and the outlet 22b of the housing structure of the device 22 is a spillage member, designated as a whole by 30.

In conformance with the invention, the spillage member 30 has a body made of a material that is permeable to water and to air, and is such as to be traversed by water and air at least when the pump 3 of the machine is active. In various embodiments, the body of the member 30 is a substantially porous body, for example provided with micro-passages designed to enable a modest seepage of water and air between the inlet 22a and the outlet 22b.

The body of the member 30 is preferentially made of a polymeric material, even of a spongy or cell type.

In preferred embodiments, the dimensions and/or porosity of the body of the member 30 are chosen so that, in the course of a single operating cycle of the machine aimed at preparing a beverage (indicatively about 30 s of activation of the pump), and with a pump designed to generate a delivery pressure comprised between 2 and 15 bar, the device 22 will enable spillage of an amount of water comprised between 8 and 20 cc, preferably approximately 10 cc. In general terms, with a porous permeable body of a generally elongated shape, as in the case exemplified in FIGS. 2-5, seepage of the water is substantially inversely proportional to the pore size and to the length of the body itself.

In preferred embodiments, the permeable body of the spillage member 30 is mounted in a stationary position within the corresponding casing structure, i.e., in a non-sliding or non-movable way. For this purpose, in various embodiments, the casing structure may be configured for defining a housing seat for the permeable body, provided with at least one contrast surface for a corresponding longitudinal end of the body itself.

Figure 3:
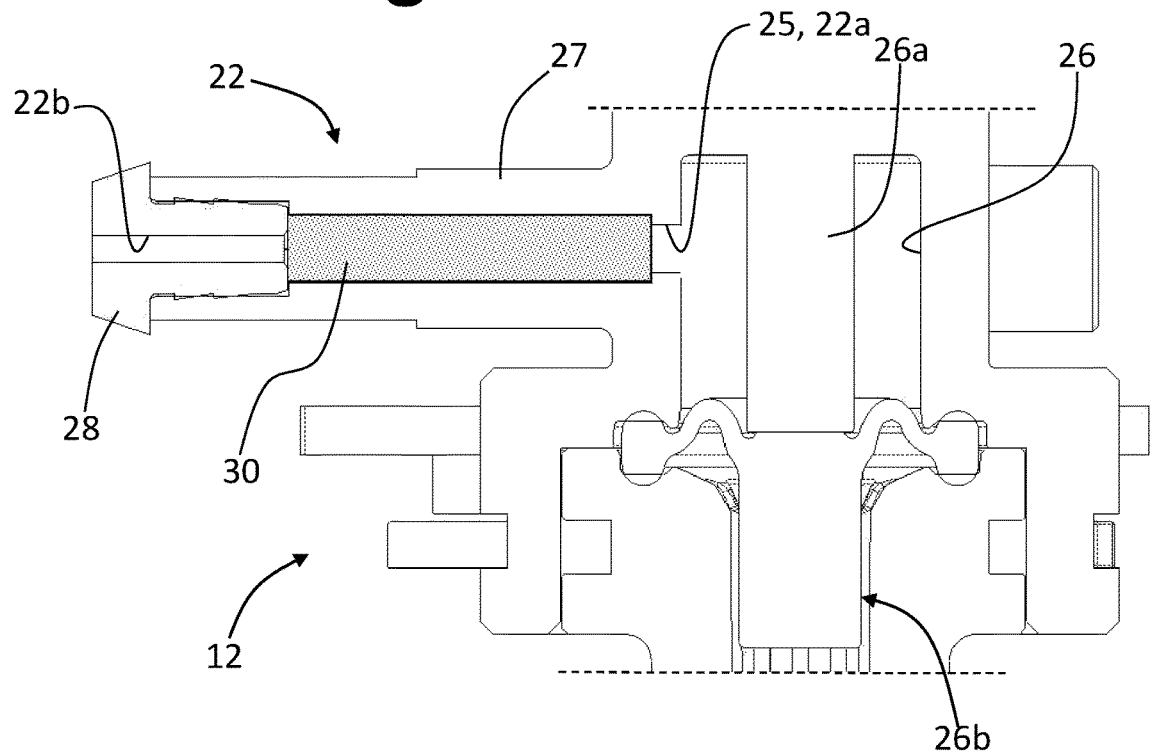
FIG. 3 is a partial and schematic cross-sectional view according to a plane of section orthogonal to that of FIG. 2, of a valve device that integrates a self-priming device according to possible embodiments of the invention.
Figure 4:
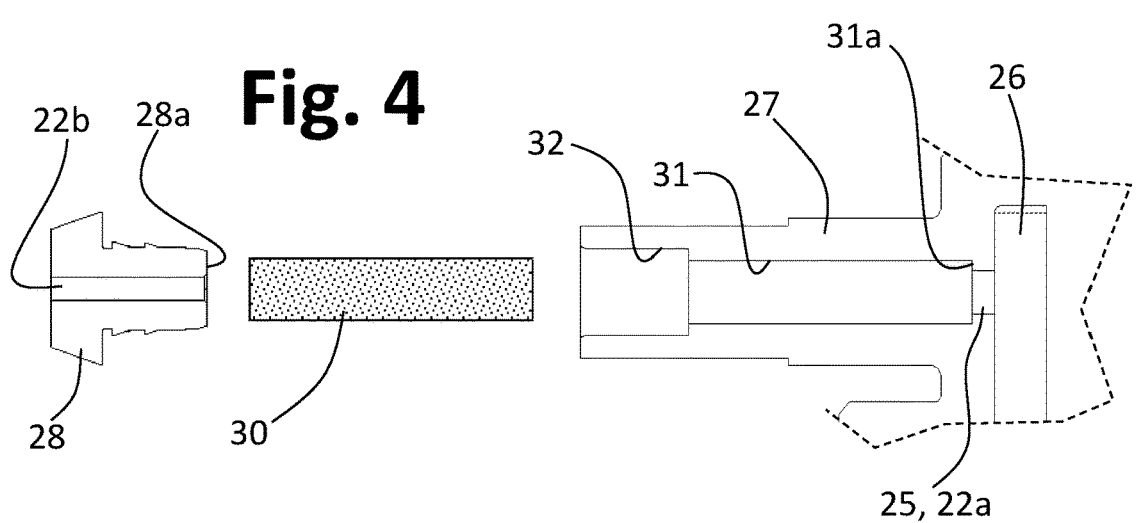
FIG. 4 is an exploded schematic cross-sectional view, of some parts of the self-priming device of FIG. 3.

With reference also to FIG. 3 and, in particular, to FIG. 4, it may be noted how —in the example illustrated—defined within the casing 27 is a seat 31, sized for receiving the body of the member 30.

Preferentially, the casing 27 has an end wall, here made in the body of the valve 12 in which the inlet 22a is defined and which defines a contrast surface, designated by 31a, upon which the inlet end of the body of the member 30 can come to bear.

In order to prevent movements of the body of the member 30, possibly even in the absence of one or more purposely provided contrast surfaces, the permeable material that forms the body itself may be elastically deformable. In this way, the permeable body may have dimensions even larger than those of the seat 31 and be inserted therein in a partially compressed condition. Preferentially, the body of the member 30 has in any case a cross-sectional dimension or diameter that is larger than the corresponding cross-sectional dimension or diameter of at least one from among the inlet 22a, the outlet 22b, and the seat 31 (or the seat 32, with reference to FIGS. 6-9).

Also visible in cross-sectional view in FIG. 4 is the closing element 28, the inner end face of which in turn defines a contrast surface 28a for the outlet end of the body of the member 30.

Preferentially, the axial cavity of the casing 27 has a seat 32 for fitting therein a corresponding portion of the closing element 28. In the example illustrated, the closing element 28 has a head, designed to remain on the outside of the casing 27, and a stem, designed to be fitted within the seat 32, which is here defined at the end of the casing 27 opposite to the inlet 22a. The seat 32 preferentially has cross-sectional dimensions or a diameter larger than the corresponding cross-sectional dimensions or diameter of the seat 31. The stem of the element 28 preferentially has cross-sectional dimensions smaller than those of its head. Preferentially, moreover, the stem has suitable means for it to be withheld in the seat 32, for example comprising teeth or a surface knurling suitable for enabling it to grip on the inner surface of the seat 32; this measure may, for example, be adopted when the stem is interference fitted into the seat 32b. On the other hand, according to possible variants, the stem could be provided with a male thread, and the seat 32 with a female thread.

Figure 5:
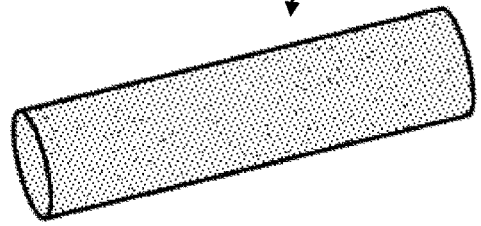
FIG. 5 is a schematic perspective view of a bleeder member of a self-priming device according to possible embodiments of the invention.
Figure 6:
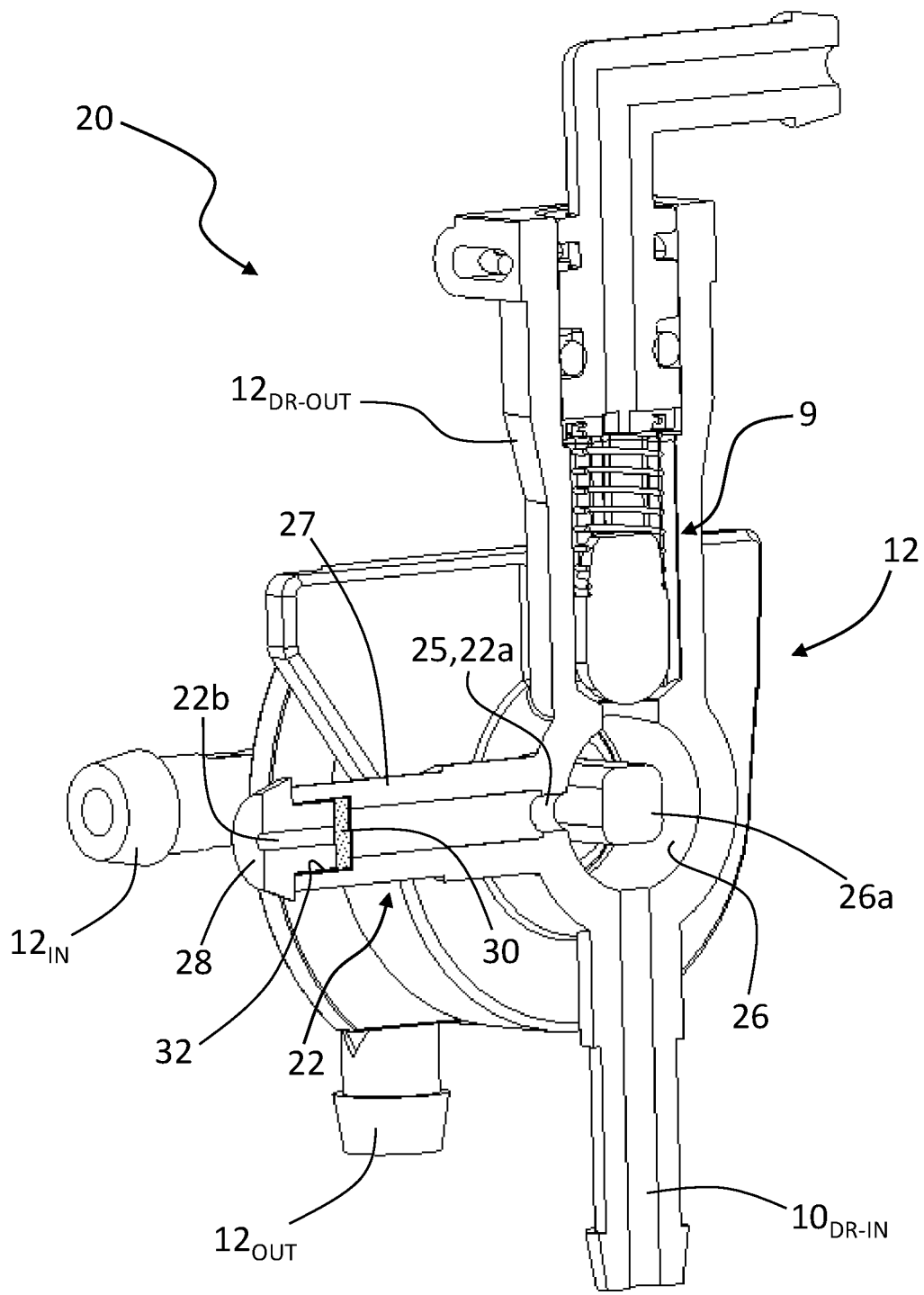
FIGS. 6-9 are views similar to those of FIGS. 2-5, but regarding further possible embodiments of the invention.
Figure 7:
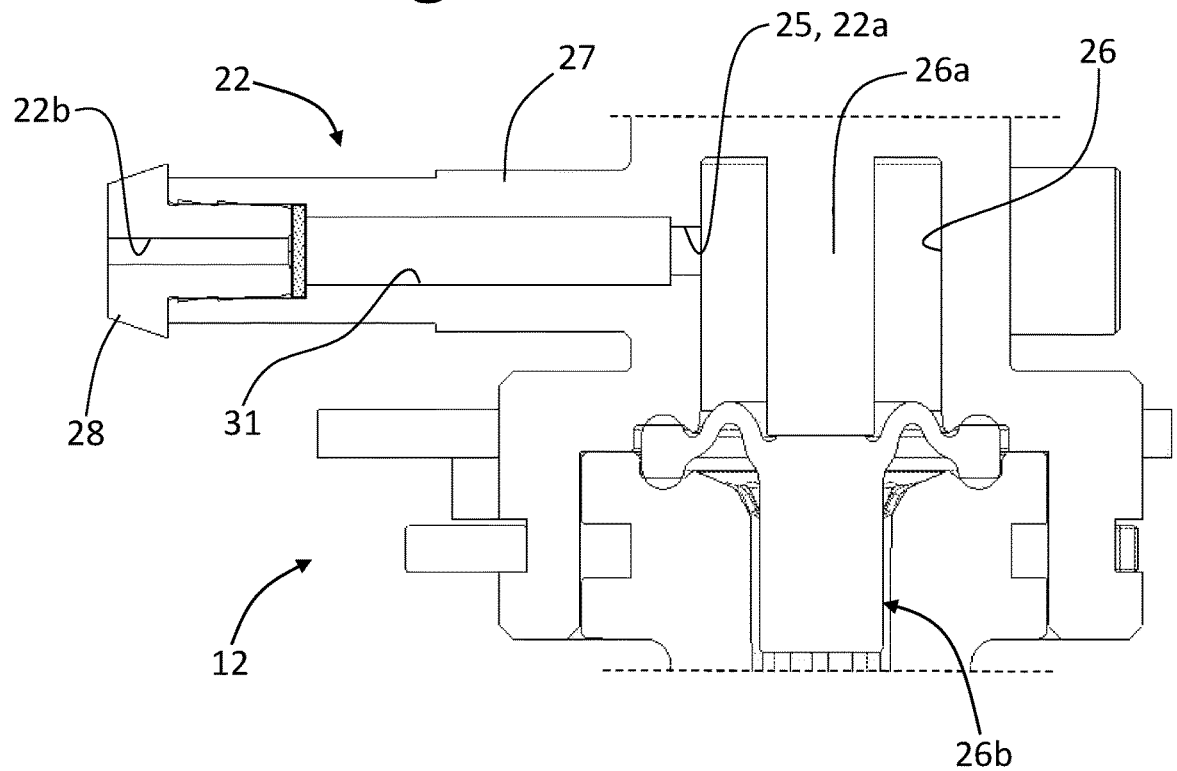
Figure 8:
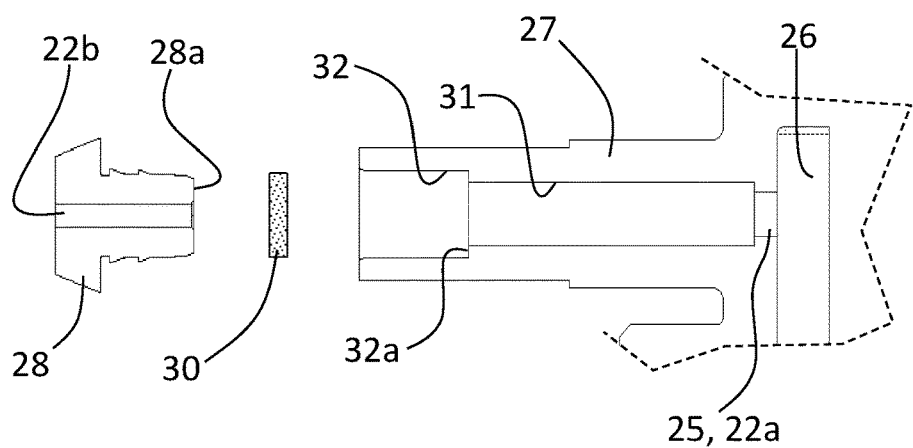

In the case exemplified so far, the body of the spillage member 30 has a substantially cylindrical shape, as highlighted in FIG. 5, but in other embodiments this shape could be different, and also includes shapes that are substantially prismatic or polyhedral (for example, a small block that is substantially cubic or parallelepipedal).

Figure 9:
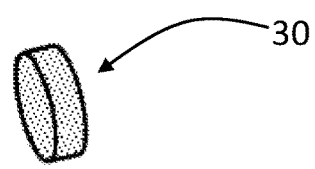

FIGS. 6-9, where the same reference numbers as those of the previous figures are used, illustrate the case where the body of the spillage member 30 is substantially disk shaped, as depicted in FIG. 9.

In an embodiment of this sort, the portion of cavity that forms the seat 31 of FIG. 4 is not occupied by the spillage member 30. The body of the spillage member is, instead, housed within a seat 32, designed to receive partially the closing element 28. In this case, the bottom of the seat 32 defines the contrast surface 32a—as highlighted in FIG. 8—for the inlet end of the body of the member 30. It will be appreciated that, in embodiments of this sort, the stem of the element 28 is shorter or, conversely, the seat 32 is longer than in the case of FIGS. 2-5. Obviously, the casing 27 could also have a length shorter than in the case exemplified, sufficient for definition of just the seat 32, without any need for the seat 31 of FIG. 4.

It will be appreciated that, if need be, the spillage members 30 described with reference to FIGS. 2-5 and 6-9 may be replaced, after prior removal of the closing element 28.

Of course, on the basis of the principles set forth in relation to FIGS. 6-9, the body of the spillage member 30 may be configured like a membrane, possibly also made of a non-woven fabric, the degree of permeability to air and water of which will enable the purposes of the invention to be achieved. In various embodiments, the body of the spillage member is obtained from a polymeric porous membrane, for example (but not exclusively) with a base of mixed cellulose esters (MCEs), or else with a base of polyvinylidene fluoride (PVDF), or else with a base of poly ether sulphone (PES). In general, the polymeric membranes used may have a very small thickness, for example between 100 and 155 µm, with a pore size preferably of between 0.025 and 8 µm. In this perspective, the spillage member, i.e., its permeable body, could also be formed by a layer of porous material (for example, a polymeric material of the type referred to above) deposited on the inner face of the closing element 28 so as to obstruct the outlet 22b.

In various embodiments, the housing structure of a device for self-priming according to the invention is configured as an insert, prearranged for being inserted into a tubular duct or the like belonging to a hydraulic member of the machine for the preparation of beverages. Embodiments of this sort are exemplified in FIGS. 10 and 11.

Figure 10:
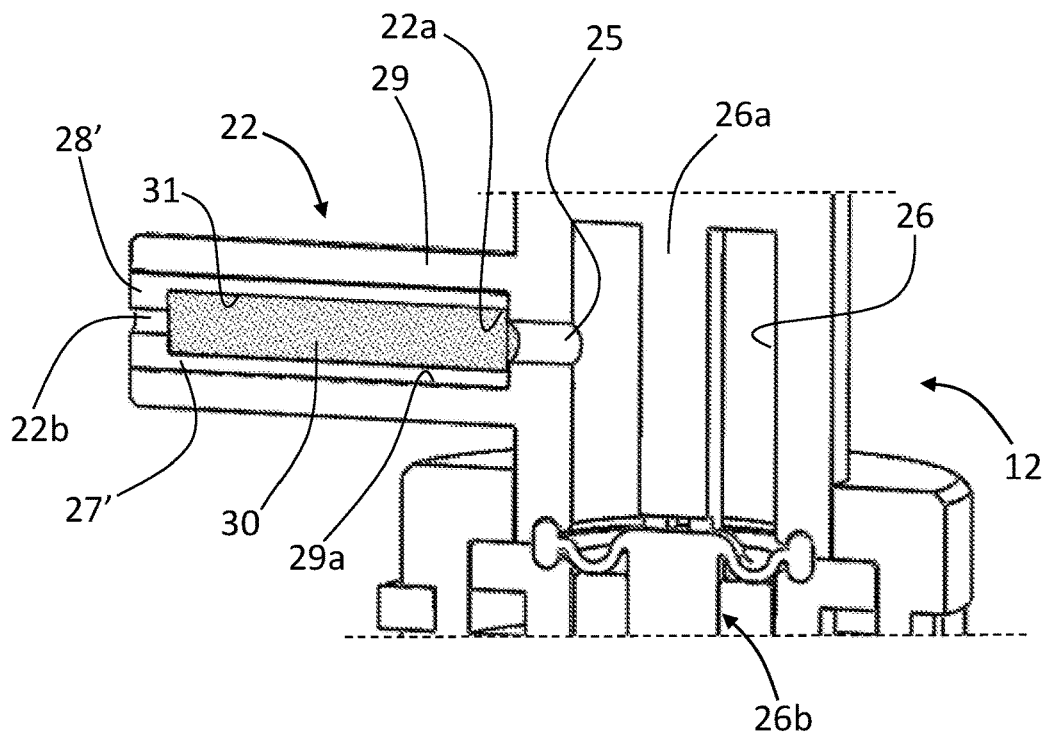
FIGS. 10 and 11 are partial and schematic cross-sectional views of valve devices that integrate respective self-priming devices according to further possible embodiments of the invention.
Figure 11:
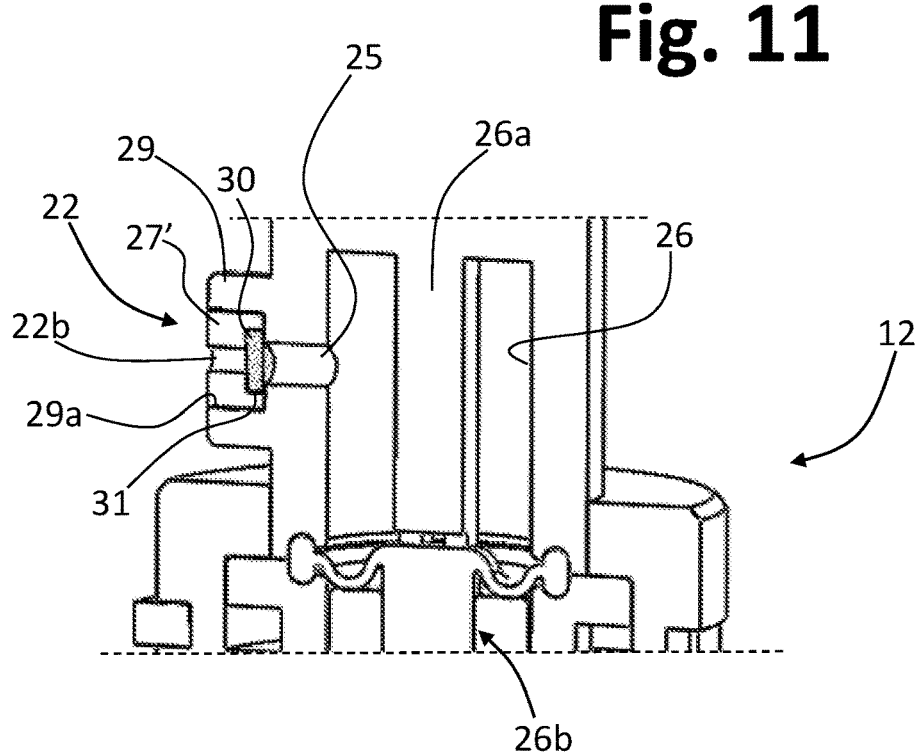

FIG. 10 exemplifies the case of a valve of the machine according to the invention (here assumed as being a valve of the type previously designated by 12) that has, at its outlet 25, a tubular connector 29, inserted in which is the device 22.

In this case, the housing structure comprises a body or insert 27' prearranged for being inserted into the axial cavity 29a of the connector 29. In various embodiments, the body or insert 27' is substantially cylindrical and interference fitted into the cavity 29a. Also in embodiments of this sort, the insert 27' defines a seat 31 for the body of the permeable element 30, with said seat that opens at the distal end of the insert itself, in order to enable insertion therein of the body of the spillage member 30 and thus form the inlet 22a. In the case exemplified, the permeable body has a diameter or cross-sectional dimension larger than that of the outlet 25 of the valve 12: in this way, the body of the valve 12—in its part that surrounds the outlet 25—defines a contrast surface both for the insert 27' and for the permeable body contained therein. At the opposite end, the insert 27' has a transverse wall 28', which forms the contrast surface for the outlet end of the body of the permeable member 30. Provided in the aforesaid wall is a passage or hole that forms the outlet 22b of the self-priming device 22.

FIG. 10 illustrates the case of a body of the spillage member having a substantially cylindrical elongated shape. The same concepts as those described with reference to FIG. 10 may on the other hand be applied also to the case of a disk-shaped permeable body, as exemplified in FIG. 11, where the same reference numbers of FIG. 10 are used to designate elements that are technically equivalent to the ones already described above. As has been mentioned for FIGS. 6-9, also in embodiments of the type represented in FIG. 11, the permeable body may be obtained by a membrane, for example of the type referred to above. In possible embodiments of this sort, the spillage member may conveniently comprise a support or frame for the membrane, for example a peripheral frame in order to facilitate mounting thereof in position.

The device for self-priming provided according to the invention may of course be connected in various points of the hydraulic circuit of a machine for the preparation of beverages, in particular downstream of the pump, even not directly associated to or integrated in a hydraulic component of the machine.

Figure 12:
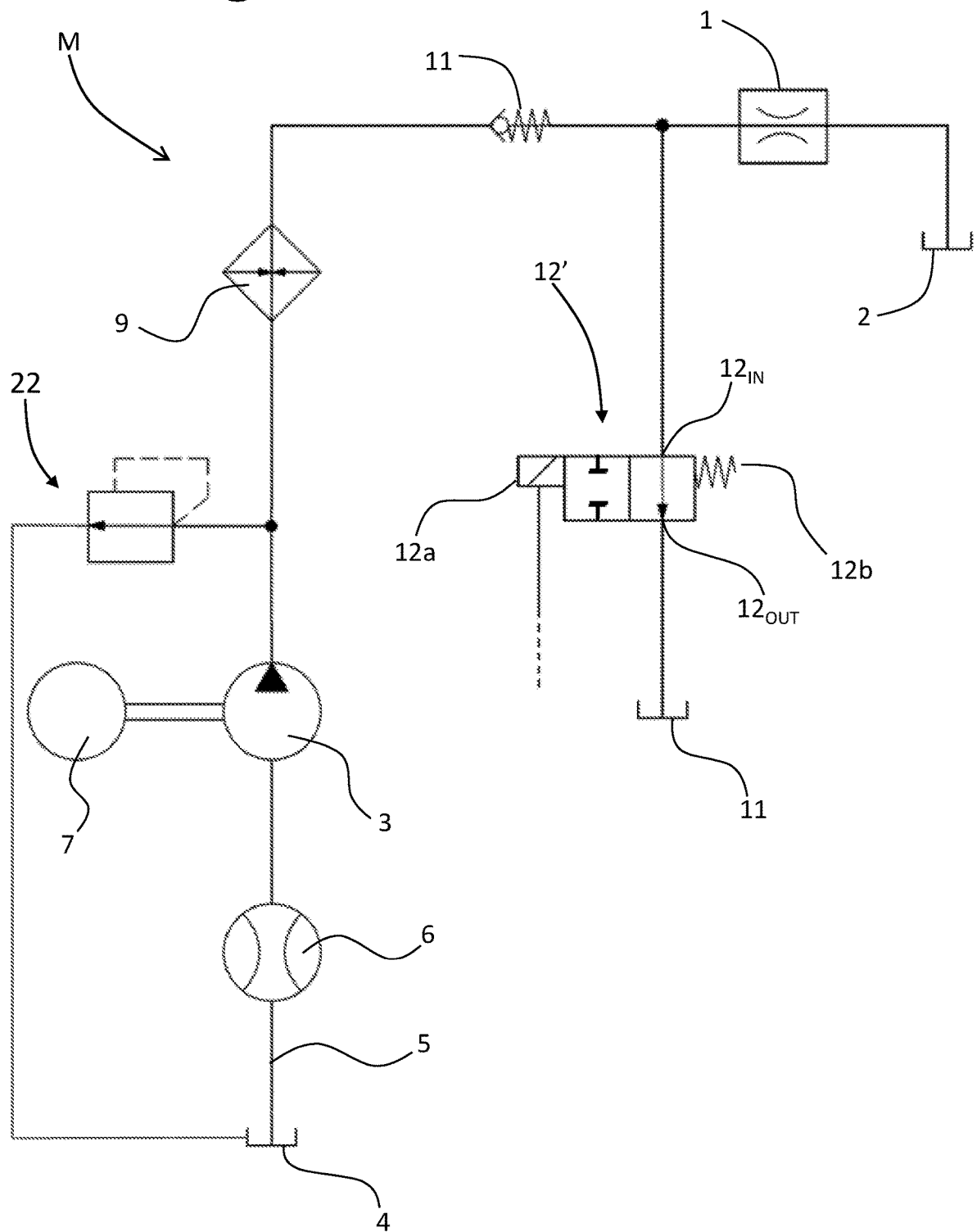
FIG. 12 is a schematic illustration of a machine for the preparation of beverages according to further possible embodiments of the present invention.

For this purpose, in various embodiments, the self-priming device comprises a casing body of its own, which is configured for fluid connection to a different element of the hydraulic circuit of the machine. Such a case is exemplified in FIG. 12, where the device for self-priming 22 is connected in fluid communication to the delivery of the pump 3, upstream of the heating device 9, and in isolation from other components (in the case of FIG. 12, the unidirectional valve 10 is omitted and the hydraulically driven valve 12 of FIG. 1 is replaced by a simple normally open electromagnetic valve 12', the valve member of which is driven into the closing condition by a solenoid 12a, countering the action of a spring 12b).

Figure 13:
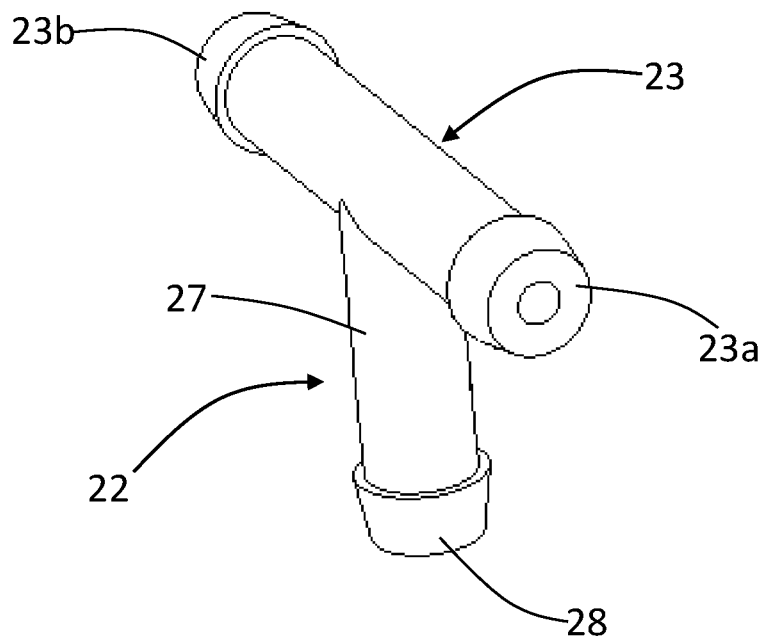
FIG. 13 is a schematic perspective view of a self-priming device that can be used in the machine of FIG. 12.

In embodiments of this sort, the housing structure of the device 22 may belong to a connector, in particular of the T type, as illustrated in FIG. 13, where the same reference numbers as those of the previous figures are used to designate elements that are technically equivalent to the ones already described above. In the example, then, the body of the connector—designated as a whole by 23—defines in a single piece, in addition to the tubular part 27 for housing the spillage member, also an inlet 23a for fluid connection towards the delivery of the pump 3, and an outlet 23c for fluid connection towards the heating device 9. The inlet 23a and the outlet 23b may, for example, be connected to respective flexible tubes. Also in this case, the housing structure of the device 22 may advantageously include a closing element 28 defining the outlet of the device for self-priming 22 (here not visible).

Figure 14:
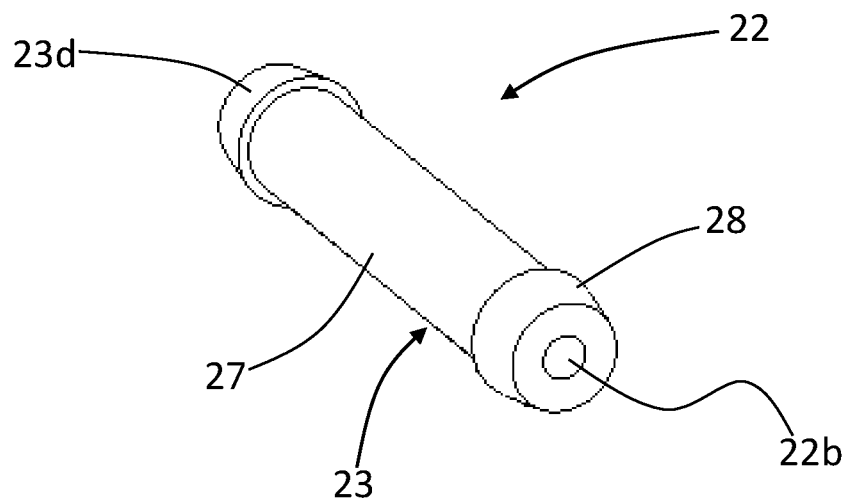
FIG. 14 is a schematic perspective view of a self-priming device according to a further embodiment of the invention.

FIG. 14 illustrates a further possible embodiment of the body 23 of a device for self-priming 22, which comprises a substantially tubular part 27. The tubular part 27 is provided with an end 23d defining the inlet (22a) of the self-priming device 22 and configured for fluid connection, for example, to a tube connected in the hydraulic circuit downstream of the pump (for instance, to a connector of the type designated by 29 in FIG. 10), and, at the other end, with an outlet 22b, for example defined by a closing element of the type already designated by 28. Also the end 23d could be constituted by an element of the type designated by 28.

Irrespective of the specific embodiment of the housing structure and the modalities of connection in the hydraulic circuit of the machine, the device for self-priming 22 guarantees—via elimination or at least reduction of the presence of air in the circuit downstream of the pump—the presence of pressurised water in the circuit, when the pump is active, also with the brewing unit containing the dose of precursor (for example in the form of a capsule) closed. The amount of water that traverses the permeable body of the spillage member 30 is modest and, since it is clean water, may be conveniently made to flow towards the tank of the machine. Interruption of operation of the pump brings the hydraulic circuit of the machine back to ambient pressure, and in this condition spillage of water by the device 22 is interrupted.

In the case of use of the device 22 in combination with hydraulically driven valves for example, of the same type as the one designated by 12 in FIG. 1 the pressure generated by activation of the pump 3 in a driving chamber brings about closing of a valve member (such as the one designated previously by 26b), which interrupts the fluid connection between the main inlet $12_{IN}$ and the outlet $12_{OUT}$, as mentioned previously. Instead, after interruption of operation of the pump 3 at the end of a cycle of delivery of a beverage, the self-priming device 22 guarantees the necessary drop in pressure in the aforesaid driving chamber 26, with consequent return of the valve member 26b into the condition of opening of the passageway between the main inlet $12_{IN}$ and the outlet $12_{OUT}$ (see, for example, what is described in the international patent application No. PCT/IB2016/053490 referred to above).

From the foregoing description the characteristics of the present invention emerge clearly, as likewise do its advantages. The device for self-priming provided according to the invention is simple and economically advantageous to produce, as well as of reliable operation, in so far as it is not affected by the wear typical of the prior art. The self-priming device described is, if need be, easily integrated in other hydraulic elements of the machine for the preparation of beverages (for example, in a valve or other valve device), and works efficiently, not only in combination with vibration pumps, but also in combination with pumps with non-impulsive operation, i.e., with constant delivery, such as the one designated by 3. A permeable spillage member of the type described is able to perform effectively its own functions irrespective of the delivery of the pump.

Of course, the embodiments and the details of construction may vary widely with respect to what has been described and illustrated herein purely by way of non-limiting example, without thereby departing from the scope of the invention as defined in the annexed claims.

Amongst the possible variant embodiments, it is pointed out that the material permeable to water and air designed to provide the bleeder member could be injected in the production stage in the corresponding casing structure, and then perform the functions described following upon its solidification or polymerisation.

The invention claimed is:

1. A machine for the preparation of beverages, comprising a hydraulic circuit including:
   a brewing unit;
   a water tank;
   a pump having its inlet connected in fluid communication with the water tank and its outlet or delivery connected in fluid communication with the brewing unit;
   a heating device for heating water forced by the pump towards the brewing unit;
   a device for self-priming, which comprises a hollow housing structure, having an inlet in fluid communication with the outlet or delivery of the pump, and an outlet for spillage of water towards a collecting space;
   wherein the device for self-priming comprises a spillage member that is set between the inlet and the outlet,
   wherein the spillage member comprises a body formed with a material permeable to water and to air, said body suitable to be passed through by water and air when the pump is active,
   wherein the body of the spillage member is a substantially porous body.

2. The machine according to claim 1, wherein the body of the spillage member is set in a stationary position within the housing structure.

3. The machine according to claim 1, wherein the housing structure is at least in part defined in a single piece with the body of a hydraulic member of the machine.

4. The machine according to claim 1, wherein the housing structure comprises a casing body of its own, configured for fluidic connection with a body of a different element of the hydraulic circuit of the machine.

5. The machine according to claim 1, wherein the body of the spillage member has a cylindrical shape, or else a disk-like shape, or else a membrane-like shape, or else a polyhedral shape.

6. The machine according to claim 1, wherein the body of the spillage member is formed with a polymeric material.

7. A device for self-priming of a machine for the preparation of beverages according to claim 1, the device for self-priming comprising:
   a hollow housing structure, having an inlet configured for being connected in fluid communication with the outlet or delivery of a pump of the machine, and an outlet for spillage of water towards a collecting space; and
   a spillage member, which is set between the inlet and the outlet of the housing structure,
   wherein the spillage member has a body formed with a material permeable to water and to air, said body being prearranged to be passed through by water and air pressurised by the pump of the machine, the body of the spillage member being a substantially porous body.

8. An integrated valve device of a machine for the preparation of beverages, comprising a device for self-priming according to claim 7.

9. The machine according to claim 1, wherein the collecting space comprises the water tank.

10. The machine according to claim 1, wherein the housing structure is at least in part defined in a single piece with a valve device of the machine.

11. The machine according to claim 4, wherein the casing body is configured for fluidic connection to a hose or else being configured substantially as a T connector.

12. A machine for the preparation of beverages, comprising a hydraulic circuit including:
   a brewing unit;
   a water tank;
   a pump having its inlet connected in fluid communication with the water tank and its outlet or delivery connected in fluid communication with the brewing unit;
   a heating device for heating water forced by the pump towards the brewing unit;
   a device for self-priming, which comprises a hollow housing structure, having an inlet in fluid communication with the outlet or delivery of the pump, and an outlet for spillage of water towards a collecting space;
   wherein the device for self-priming comprises a spillage member that is set between the inlet and the outlet,
   wherein the spillage member comprises a body formed with a material permeable to water and to air, said body suitable to be passed through by water and air when the pump is active,
   wherein the housing structure comprises an axially hollow tubular body, within which the body of the spillage member is housed, and at least one closing element coupled to a corresponding end of the tubular body, the at least one closing element defining one of the inlet or the outlet of the housing structure.

13. The machine according to claim 12, wherein the at least one closing element defines an abutment surface for a longitudinal end or face of the body of the spillage member.

14. A machine for the preparation of beverages, comprising a hydraulic circuit including:
   a brewing unit;
   a water tank;
   a pump having its inlet connected in fluid communication with the water tank and its outlet or delivery connected in fluid communication with the brewing unit;
   a heating device for heating water forced by the pump towards the brewing unit;
   a device for self-printing, which comprises a hollow housing structure, having an inlet in fluid communication with the outlet or delivery of the pump, and an outlet for spillage of water towards a collecting space;
   wherein the device for self-printing comprises a spillage member that is set between the inlet and the outlet;
   wherein the spillage member comprises a body formed with a material permeable to water and to air, said body suitable to be passed through by water and air when the pump is active,
   wherein the housing structure has a positioning seat for the body of the spillage member;
   wherein the body of the spillage member has a cross-sectional dimension or diameter that is greater than a corresponding cross-sectional dimension or diameter of at least one from among the inlet, the outlet or the positioning seat of the housing structure.

15. A machine for the preparation of beverages, comprising a hydraulic circuit including:
   a brewing unit;
   a water tank;
   a pump having its inlet connected in fluid communication with the water tank and its outlet or delivery connected in fluid communication with the brewing unit;
   a heating device for heating water forced by the pump towards the brewing unit;
   a device for self-priming, which comprises a hollow housing structure, having an inlet in fluid communication with the outlet or delivery of the pump, and an outlet for spillage of water towards a collecting space;
   wherein the device for self-priming comprises a spillage member that is set between the inlet and the outlet,
   wherein the spillage member comprises a body formed with a material permeable to water and to air, said body suitable to be passed through by water and air when the pump is active,
   wherein the housing structure is configured as an insert prearranged for insertion into a tubular duct belonging to a hydraulic member of the machine.

16. A machine for the preparation of beverages, comprising a hydraulic circuit including:
   a brewing unit;
   a water tank;
   a pump having its inlet connected in fluid communication with the water tank and its outlet or delivery connected in fluid communication with the brewing unit;
   a heating device for heating water forced by the pump towards the brewing unit;
   a device for self-priming, which comprises a hollow housing structure, having an inlet in fluid communication with the outlet or delivery of the pump, and an outlet for spillage of water towards a collecting space;
   wherein the device for self-priming comprises a spillage member that is set between the inlet and the outlet,
   wherein the spillage member comprises a substantially porous body formed with a material permeable to water and to air, said substantially porous body being suitable to be passed through by water and air when the pump is active,
   wherein the housing structure has a positioning seat for the body of the spillage member,
   wherein the positioning seat for the body of the spillage member defines an abutment surface for at least one longitudinal end or face of the body of the spillage member.

\* \* \* \* \*